Jan. 27, 1942.  A. N. ASSELIN  2,270,989
FLUSH VALVE
Filed April 7, 1941
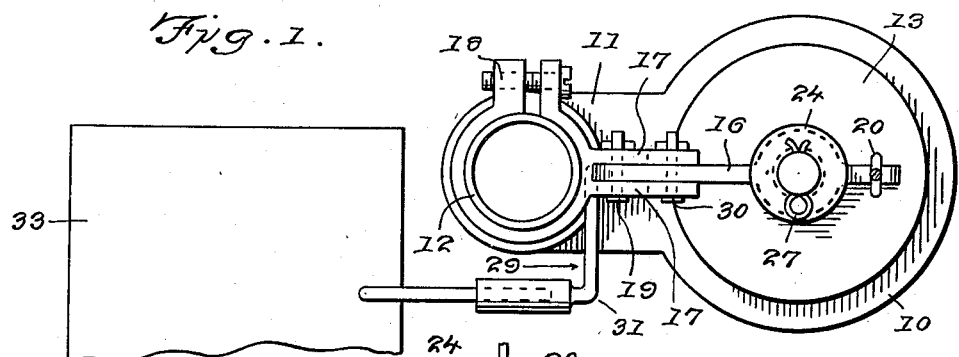
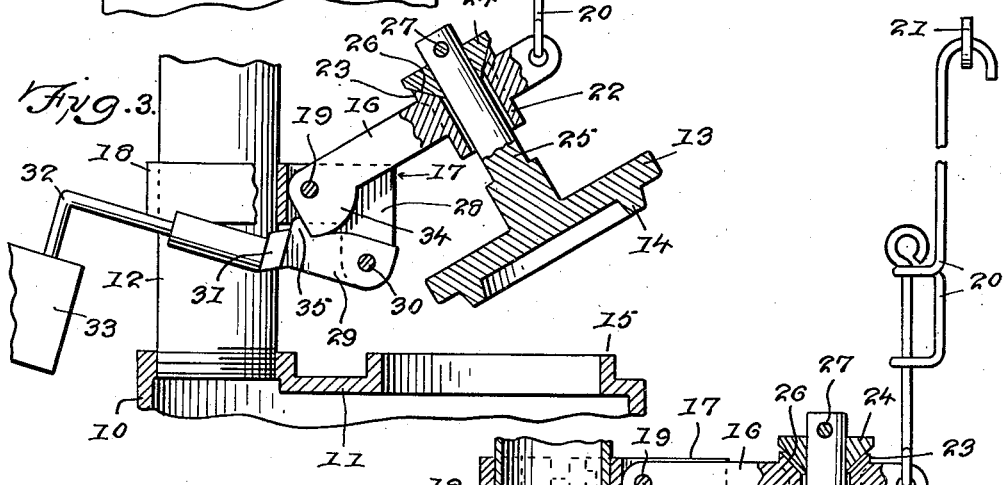
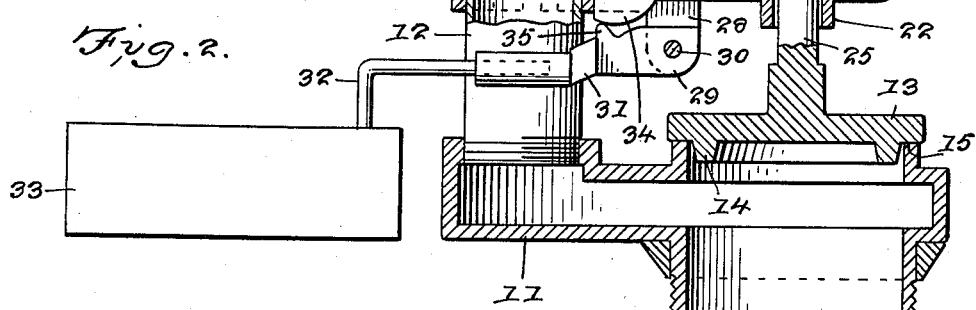
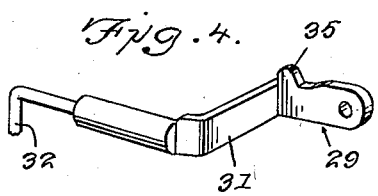
Arthur N. Asselin
INVENTOR
BY Victor J. Evans & Co.
ATTORNEYS Patented Jan. 27, 1942

2,270,989

UNITED STATES PATENT OFFICE 2,270,989

FLUSH VALVE

Arthur N. Asselin, Fall River, Mass.

Application April 7, 1941, Serial No. 387,353

1 Claim. (Cl. 4—53)

This invention relates to flush valves, and has for an object to provide a simplified flush valve which cannot be closed by suction and will prevent the shutting off of the flushing water before it is all used, to this end the valve being operated by a float to keep it open, and to close it automatically, when the supply of water in the tank is about one-eighth inch above the top of the outlet.

A further object is to provide a flush tank valve which is free to rotate so that it will accurately seat itself after each actuation.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a plane view of a flush valve constructed in accordance with the invention.

Figure 2 is a longitudinal sectional view of the valve in closed position.

Figure 3 is a fragmentary longitudinal sectional view of the valve in open position.

Figure 4 is a detail perspective view of the float operated lever and pawl for holding the valve in full open position until the float recedes.

Referring now to the drawing in which like characters of reference designate similar parts in the various views, 10 designates a flush tank outlet pipe having a lateral extension 11 into which is screw-threadedly engaged an overflow pipe 12. In carrying out the invention, a disk valve 13 is provided on the underside with a guide flange 14, adapted to enter the open top of the outlet pipe 10, which forms a seat 15 for the disk valve 13.

The valve is loosely suspended from an arm 16 which is engaged between hinge ears 17 which project from one side of a split ring clamp bracket 18 which is secured to the overflow pipe 12 near the bottom thereof. A pivot pin 19 is passed through the arm and through the hinge ears to hingedly connect the arm to the bracket. The free end of the arm is connected to conventional links 20, which are connected to the conventional operating lever 21 of a flush tank valve mechanism.

The valve is suspended from the arm 16 by a tubular guide bushing 22 which is fixed to the arm, the bushing having a flared upper end 23. A guide washer 24 is mounted on the upper end of the stem 25 of the valve and is provided with a conical bottom face 26 which engages the flared upper end 23 of the bushing when the lever is rocked upwardly on its pivot so that the bushing may lift the valve 13 from the closed position shown in Figure 2, to the open position shown in Figure 3. A cotter pin 27 is engaged through the valve stem and bears upon the top face of the washer to prevent the washer becoming accidentally disengaged from the valve stem.

Preferably the washer is shrunk onto the valve stem in such manner that a space exists between the washer and the flared upper end of the bushing when the valve is closed so that complete closure of the valve will be assured after each actuation. Also this space permits the valve rotating freely during the final stages of the closing movement so as to seat accurately.

Links 28 extend downwardly at a right angle from the ears 17 of the bracket. A float lever 29 is pivotally connected at one end between the lower ends of the links by a pivot pin 30. The lever is offset, as shown at 31, to pass around the overflow pipe 12, and beyond the overflow pipe is extended downwardly, as shown at 32. A float 33 is fixed to the downwardly extending end of the lever.

A cam 34 is formed on the lower edge of the pivoted end of the arm 16 and is provided with a curved edge concentric with the pivot pin of the arm and with a straight edge which engages the clamp between the ears 17 to hold the arm horizontal. A pawl 35 is formed integral with the upper edge of the lever 29 and normally engages the curved edge of the cam. When the valve operating lever 21 is actuated, the links 20 lift the free end of the arm 16 and rock the arm upwardly on its pivot 19 to lift the valve from its seat 15 to fully open position. As the valve arrives at fully open position, the cam 34 on the arm 16 lodges in back of the rear side of the pawl 35, as best shown in Figure 3, and releasably holds the valve in open position. As the flushing water in the tank escapes through the outlet pipe, the float 33 will recede with it until the supply of water in the tank is about one-eighth inch above the top of the valve seat, at which time the float will have moved the lever 29 sufficiently to disengage the pawl 35 from the cam 34 and allow the valve to gravitate to fully closed position on its seat 15 on the outlet pipe.

Since the operation of the parts has been described as the description of the parts progressed, it is thought the invention will be fully understood without further explanation.

What is claimed is:

A flush valve comprising the combination with an outlet pipe and an overflow pipe, of a split ring clamp secured to the overflow pipe near the bottom thereof, a horizontally disposed hinge ear on the clamp, an integral link on the outer end of the ear extending downwardly at a right angle to the ear, an arm pivoted at one end to the inner end of the ear, a lever extending in a direction opposite to the arm pivoted at one end to the link at a point underneath the pivoted end of the arm, a valve on the arm for closing the outlet pipe, means for manually rocking the arm upwardly to open the valve, a cam on the lower edge of the pivoted end of the arm having a curved edge the center of curvature of which is at the pivot of the arm and having a straight edge between the pivot of the arm and the ring clamp normally engaging the clamp to hold the arm in horizontal position to hold the valve closed, an integral pawl extending upwardly from the upper edge of the pivoted end of the lever, a float on the end of the lever normally holding the pawl in engagement with the curved edge of the cam the curved edge of the cam riding off of the pawl when the arm is rocked upward to open the valve and the straight edge of the cam lodging against the rear side of the pawl, said float maintaining the engagement of the straight edge of the cam in rear of the pawl to hold the valve open until the float gravitates, gravitation of the float withdrawing the pawl from engagement with the straight edge of the cam to permit the arm to gravitate and lower the valve to closed position.

ARTHUR N. ASSELIN.